US006801958B2

(12) United States Patent
Gugel

(10) Patent No.: US 6,801,958 B2
(45) Date of Patent: Oct. 5, 2004

(54) METHOD AND SYSTEM FOR DATA TRANSFER

(75) Inventor: Robert Glenn Gugel, Longmont, CO (US)

(73) Assignee: Texas Instruments Incorporated, Dallas, TX (US)

(*) Notice: Subject to any disclaimer, the term of this patent is extended or adjusted under 35 U.S.C. 154(b) by 598 days.

(21) Appl. No.: 09/731,440

(22) Filed: Dec. 6, 2000

(65) Prior Publication Data

US 2002/0099881 A1 Jul. 25, 2002

Related U.S. Application Data

(60) Provisional application No. 60/170,950, filed on Dec. 15, 1999.

(51) Int. Cl.[7] .............................................. G06F 13/28
(52) U.S. Cl. ........................... 710/22; 710/23; 710/24; 710/26; 710/27; 710/28; 710/52; 711/100; 711/104; 711/105; 711/111
(58) Field of Search ............................. 710/22, 23, 24, 710/26, 27, 28, 36, 52, 74, 226; 711/100, 104, 105, 111

(56) References Cited

U.S. PATENT DOCUMENTS

| | | | | | |
|---|---|---|---|---|---|
| 5,528,587 | A | * | 6/1996 | Galand et al. ................ | 370/60 |
| 5,890,012 | A | * | 3/1999 | Poisner ......................... | 395/842 |
| 5,933,654 | A | * | 8/1999 | Galdun et al. ................ | 395/843 |
| 6,212,593 | B1 | * | 4/2001 | Pham et al. .................. | 710/226 |
| 6,298,396 | B1 | * | 10/2001 | Loyer et al. .................. | 710/22 |
| 6,418,489 | B1 | * | 7/2002 | Mason et al. ................. | 710/22 |
| 6,629,288 | B1 | * | 9/2003 | Bernath et al. .............. | 714/807 |

* cited by examiner

Primary Examiner—Jeffrey Gaffin
Assistant Examiner—Justin Knapp
(74) Attorney, Agent, or Firm—W. Daniel Swayze, Jr.; W. James Brady; Frederick J. Telecky, Jr.

(57) ABSTRACT

According to one embodiment of the present invention, a system (10) for data transfer is disclosed that comprises a transfer memory (24) having one or more buffers (40, 42, 44, 46, and 48). Accessing units comprising direct memory access units (20 and 22) are coupled to the transfer memory (24) and are operable to access the transfer memory (24). Pointers (50, 52, and 54) stored in the transfer memory (24) direct the accessing units (20 and 22) to selected ones of the buffers (44, 46, and 48) such that no two accessing units (20 and 22) are simultaneously accessing one buffer (44, 46, and 48). More specifically, the pointers (50, 52, and 54) may also direct a memory control unit (30) to a buffer that is not being accessed by an accessing units (20 and 22). According to one embodiment of the present invention, a method for data transfer is disclosed. First, a transfer memory (24) comprising one or more buffers (40, 42, 44, 46, and 48) is provided. Second, pointers (50, 52, and 54) indicating selected ones of the buffers are stored in transfer memory (24). Finally, accessing units comprising direct memory access units (20 and 22) operable to access the transfer memory (24) are directed to the buffer indicated by the pointer (50, 52, and 54), such that no two accessing units (20 and 22) are simultaneously accessing one buffer (44, 46, and 48). More specifically, a transfer memory control unit (30) may be directed to a next buffer that is not being accessed by an accessing unit (20 and 22).

18 Claims, 2 Drawing Sheets

METHOD AND SYSTEM FOR DATA TRANSFER

This application claims priority under 35 USC §119(e)(1) of provisional application No. 60/170,950 filed Dec. 15, 1999.

TECHNICAL FIELD OF THE INVENTION

This invention relates generally to the field of data processing systems and more specifically to a method and system for data transfer.

BACKGROUND OF THE INVENTION

The increasing complexity and use of data processing systems has resulted in the demand for faster and more efficient methods of data transfer. Data transfer operations that require processing of the data by a processing unit, however, may slow down or decrease the efficiency of the data processing system. Accordingly, eliminating the need for intervention by the primary processor system is an effective approach for improving the speed and efficiency of data transfer. A direct memory access unit (DMA) may be used to transfer data to and from a memory without the intervention of a primary processing unit. To transfer data from a first memory through a transfer memory to a second memory, a first DMA reads the data from the first memory and then writes the data to the transfer memory. Then, a second DMA reads the data from the transfer memory and then writes the data to the second memory, thus completing the data transfer without processor intervention. Known methods and systems of data transfer using DMAs, however, have not been completely satisfactory with respect to speed and efficiency.

A known method of data transfer uses a transfer memory with an X-Y buffer system. To transfer data from the first DMA through the transfer memory to the second DMA, the first DMA writes the data to buffer X of the transfer memory, while the second DMA reads from buffer Y. Then, the second DMA reads the data placed in buffer X, while the first DMA writes new data to buffer Y. After that, the second DMA read the new data placed in buffer Y, while the first DMA writes to buffer X, and so on. One problem with this method is that it is difficult for a memory control unit (MCU) to modify a buffer because there are no isolated buffers to modify.

While these approaches have provided improvements over prior approaches, the challenges in the field of data processing systems have continued to increase with demands for more and better techniques having greater speed and efficiency. Therefore, a need has arisen for a new method and system for data transfer.

SUMMARY OF THE INVENTION

In accordance with the present invention, a method and system for data transfer are provided that substantially eliminate or reduce the disadvantages and problems associated with previously developed systems and methods.

According to one embodiment of the present invention, a system for data transfer is disclosed that comprises a transfer memory having one or more buffers. Accessing units comprising direct memory access units are coupled to the transfer memory and are operable to access the transfer memory. Pointers stored in the transfer memory direct the accessing units to the buffers such that no two accessing units are simultaneously accessing one buffer. More specifically, the pointers may also direct a memory control unit to a buffer that is not being accessed by an accessing unit.

According to one embodiment of the present invention, a method for data transfer is disclosed. First, a transfer memory comprising one or more buffers is provided. Second, pointers that indicate a next buffer are stored in the transfer memory. Finally, accessing units comprising direct memory access units and operable to access the transfer memory are directed to the next buffer indicated by the pointer, such that no two accessing units are simultaneously accessing one buffer. More specifically, a memory control unit may be directed to a next buffer that is not being accessed by an accessing unit.

A technical advantage of the present invention is that it creates an isolated buffer that a memory control unit may modify while the DMAs are also accessing the transfer memory. Another technical advantage of the present invention is that the pointers direct the DMAs to many buffers in the transfer memory, allowing a first DMA to use multiple buffers to store data destined for a second DMA. More buffer space in a queue allows for a greater difference in transfer rates across the queue. As a result, the present invention enables fast, efficient pipelining of packets without processor intervention.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Figure 1:
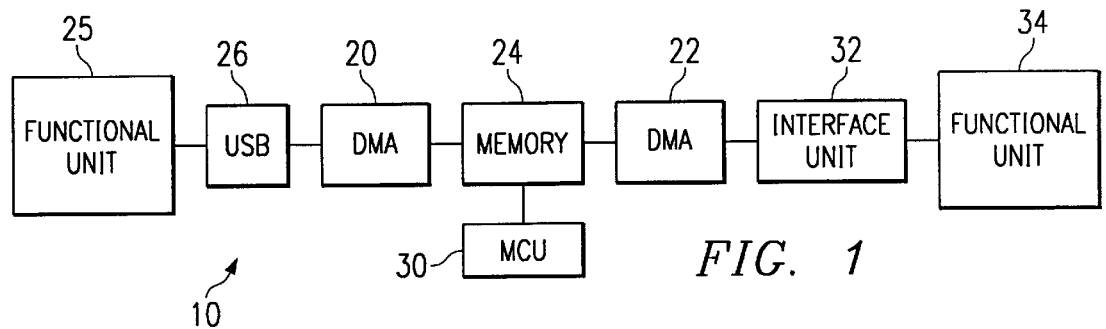
FIG. 1 is a block diagram of one embodiment of a system that may be used in accordance with the present invention.
Figure 3:
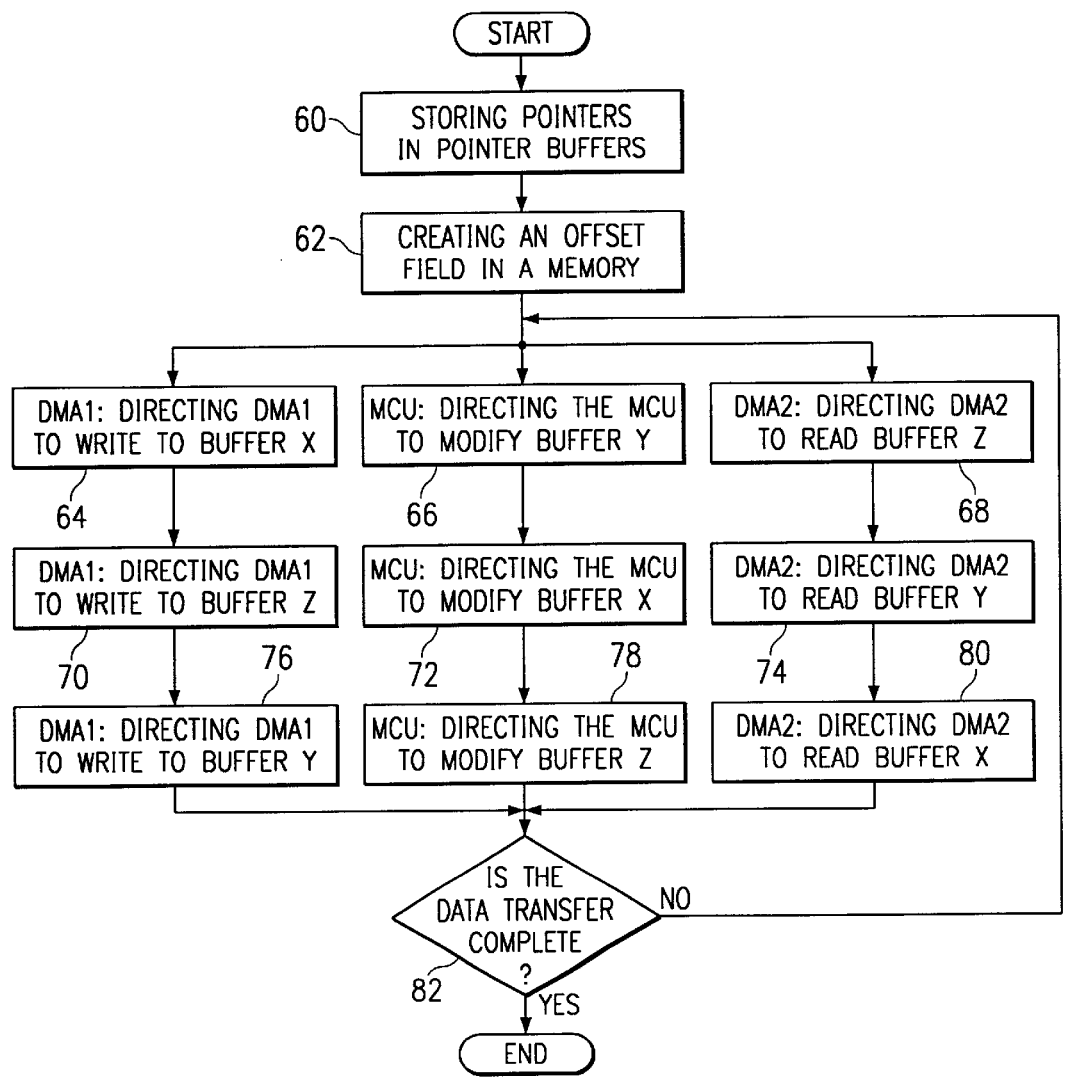
FIG. 3 is a flow chart demonstrating one embodiment of a method of data transfer that may be used in accordance with the present invention.
Figure 2:
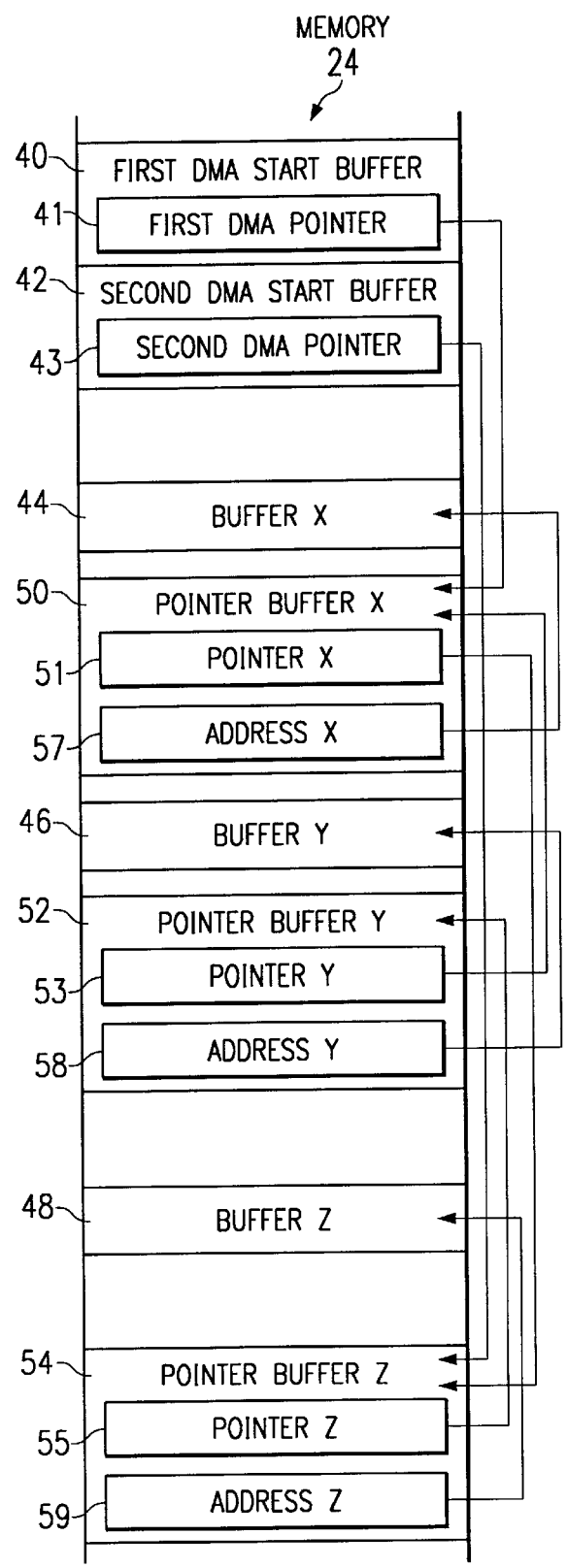
FIG. 2 illustrates, in greater detail, a diagram of a transfer memory that may be used in accordance with the present invention.

An embodiment of the present invention and its advantages are best understood by referring to FIGS. 1–3 of the drawings, like numerals being used for like and corresponding parts of the various drawings.

FIG. 1 is a block diagram of one embodiment of a system 10 that may be used in accordance with the present invention. In this embodiment, the system 10 comprises accessing units comprising a first direct memory access system (DMA) 20 and a second DMA 22 coupled to a transfer memory 24. In general, the transfer memory 24 stores data, and the DMAs 20 and 22 read from and write to the transfer memory 24. In this embodiment, the system 10 comprises a first functional unit 25 coupled to a universal system bus (USB) 26 coupled to the first DMA 20. The first functional unit may be, for example, a processor. The USB 26 delivers data to and from the transfer memory 24. The first DMA 20, which may comprise, for example, a USB buffer manager (UBM), is coupled to the transfer memory 24. The transfer memory 24 may comprise, for example, random access memory (RAM) and may comprise selected addressable locations that can act as buffers for data transfer. The accessing units may comprise a memory control unit (MCU) 30, which may be coupled to the transfer memory 24. The MCU 30 is operable to modify the buffers of the transfer memory 24.

The second DMA 22 is coupled to the transfer memory 24, and may be coupled to an interface unit 32, which in turn may be coupled to a second functional unit 34, for example, an output device.

According to one embodiment of the present invention, to transfer data from the first functional unit 25 to the second functional unit 34, data may be transferred from the first functional unit 25 though the USB 26 to the first DMA 20, which writes the data to a buffer of the transfer memory 24. Then, the second DMA 22 reads the data from the buffer of the transfer memory 24, and then the data may be transferred through an interface unit 32 to the second functional unit 34, completing the data transfer without processor intervention. Data may be transferred from the second functional unit 34 to the first functional unit 25 by reversing the procedure. While a first accessing unit, for example a DMA 20 or 22 or an MCU 30, is accessing a buffer of the transfer memory 24, that buffer cannot be accessed by a second accessing unit. The second accessing unit must wait until the first accessing unit completes accessing the transfer memory 24.

FIG. 2 illustrates, in greater detail, a diagram of a transfer memory 24 that may be used in accordance with the present invention. In this embodiment, the transfer memory 24 comprises buffers 40, 42, 44, 46, and 48. A first DMA start buffer 40 stores data comprising a first DMA pointer 41 that directs the first DMA 20 to its starting buffer. Similarly, a second DMA start buffer 42 stores data comprising a second DMA pointer 43 that directs the second DMA 22 to its starting buffer. The first DMA start buffer 40 and the second DMA start buffer 42 may be dedicated buffers. The transfer memory comprises buffers X 44, Y 46, and Z 48. Pointer buffers X 50, Y 52, and Z 54 are associated with buffers X 44, Y 46, and Z 48, respectively. Pointer buffer X 50 stores a pointer X 51 that directs the accessing unit accessing buffer X during the current cycle to the buffer it should access during the next cycle by pointing the unit to the pointer buffer of the next buffer. Similarly, pointer buffers Y 52 and Z 54 also contain pointers Y 53 and Z 55, respectively, that direct an accessing unit to the buffers they should access during the next cycle by pointing the unit to the pointer buffer of the next buffer. Pointer buffer X 50 also stores address X 57 that stores the address of buffer X 44. Similarly, pointer buffers Y 52 and Z 54 also contain addresses Y 58 and Z 59, respectively, that store the addresses of buffers Y 46 and Z 48, respectively. Pointer buffers X 50, Y 52, and Z 54 may also store the sizes of buffers X 44, Y 46, and Z 48, respectively.

FIG. 3 is a flowchart demonstrating one method of data transfer that may be used in accordance with the present invention. In this embodiment, generally, the pointers X 51, Y 53, and Z 55 direct the accessing units, for example, the DMAs 20 and 22 and the MCU 30, to buffers of the transfer memory 24 to enable the DMAs 20 and 22 to use multiple buffers 44, 46, and 48 to transfer data more quickly and efficiently. The method also creates an offset buffer, that is, a buffer that is not being accessed, in the transfer memory 24 for the MCU 30 to modify while the DMAs 20 and 22 access other buffers of the transfer memory 24, resulting in faster transfer of data.

To illustrate advantages of the present invention, a data transfer operation from the first DMA 20 to the second DMA 22 will be described. The method begins with step 60, where the pointers X 51, Y 53, and Z 55 are stored in pointer buffers X 50, Y 52, and Z 54, respectively. The pointers direct the DMAs 20 and 22 and the MCU 30 to the buffers they should access during the next cycle. The method then proceeds to step 62, where an offset buffer is created in the transfer memory 24. The offset buffer is created by coordinating the pointers such that there is one isolated buffer, a buffer that is not being accessed by a DMA, in every cycle. The offset buffer allows the MCU 30 to modify the transfer memory 24 while the DMAs are also accessing the transfer memory 24. In steps 64 through 80, the next buffer pointers direct the DMAs 20 and 22 and the MCU 30 to buffers 44, 46, and 48 such that no two accessing units are simultaneously accessing the same buffer.

Generally, to transfer data from the first DMA 20 to the second DMA 22, the first DMA 20 writes to the transfer memory 24 in steps 64, 70, and 76, and the second DMA 22 reads the transfer memory 24 in steps 68, 74, and 80. The MCU 30 modifies the transfer memory 24 in steps 66, 72, and 78. TABLE 1 outlines the steps 64 through 80:

TABLE 1

|  | Cycle 1 | Cycle 2 | Cycle 3 |
| --- | --- | --- | --- |
| First DMA | Write to Buffer X (Step 64) | Write to Buffer Z (Step 70) | Write to Buffer Y (Step 76) |
| MCU | Modify Buffer Y (Step 66) | Modify Buffer X (Step 72) | Modify Buffer Z (Step 78) |
| Second DMA | Read Buffer Z (Step 68) | Read Buffer Y (Step 74) | Read Buffer X (Step 80) |

In general, steps 64, 66, and 68 may occur in the same cycle. Specifically, in step 64, a first DMA pointer 41 directs the first DMA 20 to write to buffer X 44. In step 66, the MCU 30 modifies buffer Y 46, which is the offset buffer for the current cycle. In step 68, a second DMA pointer 43 directs the second DMA 22 to read from buffer Z 48.

Generally, in steps 70, 72, and 74, the pointers X 51, Y 53, and Z 55 direct the first DMA 20, the MCU 30, and the second DMA 22, respectively, to the next buffer to access. Specifically, in step 70, the first DMA 20 writes to buffer Z 48. In step 72, the MCU 30 modifies buffer X 44. In step 74, the second DMA 22 reads buffer Y 46. Generally, a similar process occurs in steps 76, 78, and 80. Specifically, in step 76, the first DMA 20 writes to buffer Y 46. In step 78, the MCU 30 modifies buffer Z 48. In step 80, the second DMA 22 reads buffer X 44.

The method then proceeds to step 82, where it is determined whether the information transfer is complete. If the information transfer is not complete, the method then returns to steps 64, 66, and 68. If the information transfer is complete, the method terminates.

A technical advantage of the present invention is that it creates an isolated buffer that a memory control unit may modify while the DMAs are also accessing the transfer memory. Another technical advantage of the present invention is that the pointers direct the DMAs to many buffers in the transfer memory, allowing a first DMA to use multiple buffers to store data destined for a second DMA. More buffer space in a queue allows for a greater difference in transfer rates across the queue. As a result, the present invention enables fast, efficient pipelining of packets without processor intervention.

Although an embodiment of the invention and its advantages are described in detail, a person skilled in the art could make various alternations, additions, and omissions without departing from the spirit and scope of the present invention as defined by the appended claims.

What is claimed is:

1. A system for transferring data, the system comprising:

a. a transfer memory comprising one or more buffers;

b. one or more accessing units coupled to the transfer memory and operable to access the buffers of the transfer memory, wherein the accessing units comprise one or more direct memory access units; and c. one or more pointers stored in the transfer memory, wherein the pointers are associated with ones of the buffers and are operable to direct the accessing units to selected ones of the buffers, and no two accessing units are simultaneously accessing one buffer, wherein the accessing units further comprise a memory control unit coupled to the transfer memory and operable to modify the buffers of the transfer memory, wherein the pointers are operable to direct the memory control unit to an offset buffer that no accessing unit is accessing.

2. The system of claim 1 wherein one of the pointers directs one of the accessing units to one of the buffers to which the accessing unit has been previously directed.

3. The system of claim 1 wherein the accessing units further comprise a memory control unit coupled to the transfer memory and operable to modify the buffers of the transfer memory.

4. The system of claim 1 wherein the buffers comprise one or more pointer buffers, wherein the pointers are stored in the pointer buffers.

5. The system of claim 1 wherein at least one of the direct memory access units is operable to read from the buffers of the transfer memory.

6. The system of claim 1 wherein at least one of the direct memory access units is operable to write to the buffers of the transfer memory.

7. The system of claim 1 further comprising one or more functional units, wherein each functional unit is coupled to one of the direct memory access units.

8. The system of claim 1 further comprising one or more functional units, wherein one of the functional units is coupled to one of the direct memory access units and comprises a processor.

9. The system of claim 1 wherein the transfer memory is random access memory.

10. A system for transferring data, the system comprising:

a. a transfer memory comprising one or more buffers;

b. one or more accessing units coupled to the transfer memory and operable to access the buffers of the transfer memory, wherein the accessing units comprise one or more direct memory access units; and c. one or more pointers stored in the transfer memory, wherein the pointers are associated with ones of the buffers and are operable to direct the accessing units to selected ones of the buffers, and no two accessing units are simultaneously accessing one buffer, wherein the accessing units further comprise a memory control unit coupled to the transfer memory and operable to modify the buffers of the transfer memory, wherein the pointers are operable to direct the memory control unit to an offset buffer that no accessing unit is accessing, and one of the pointers directs one of the accessing units to one of the buffers to which the accessing unit has been previously directed.

11. A method for transferring data, the method comprising:

a. providing a transfer memory comprising one or more buffers;

b. storing one or more pointers in the transfer memory, wherein the pointers are associated with ones of the buffers and are operable to indicate selected ones of the buffers;

c. directing one or more accessing units operable to access the buffers of the transfer memory to the buffer indicated by the pointer, wherein no two accessing units are simultaneously accessing one buffer, wherein the accessing units comprise one or more direct memory access units;

further comprising:

d. creating one or more offset buffers; and e. directing a memory control unit to modify the offset buffers.

12. The method of claim 11 further comprising repeating the step of directing until the data transfer is complete.

13. The method of claim 11 wherein one of the pointers directs one of the accessing units to one of the buffers to which the accessing unit has been previously directed.

14. The method of claim 11 wherein the accessing units further comprise a memory control unit operable to modify the buffers transfer memory, and the directing step further comprises directing a memory control unit to the buffer indicated by the pointer, wherein no two accessing units are simultaneously accessing one buffer.

15. The method of claim 11 wherein the accessing units further comprise a memory control unit operable to modify the buffers transfer memory, and the directing step further comprises directing a memory control unit to the buffer indicated by the pointer, wherein no two accessing units are simultaneously accessing one buffer, and one of the pointers directs one of the accessing units to one of the buffers to which the accessing unit has been previously directed.

16. The method of claim 11 further comprising creating one or more offset buffers.

17. The method of claim 11 wherein the transfer memory comprises random access memory.

18. A method for transferring data, the method comprising:

a. providing a transfer memory comprising one or more buffers;

b. storing one or more pointers associated with ones of the buffers and operable to indicate selected ones of the buffers of the transfer memory;

c. creating one or more offset buffers;

d. directing a first direct memory access unit to write to the buffers indicated by the pointers and directing a second direct memory access unit to read from the buffers indicated by the pointers, wherein the first direct memory access unit and the second direct memory access unit do not simultaneously access one buffer, and one of the pointers directs the first direct memory access unit to one of the buffers to which the first direct memory access unit has been previously directed;

e. directing a memory control unit to modify the offset buffers; and f. repeating the step of directing until the data transfer is complete.

* * * * *